(12) United States Patent
Christen (10) Patent No.: US 10,657,612 B2
(45) Date of Patent: *May 19, 2020

(54) CLAIM PROCESSING VALIDATION SYSTEM (71) Applicant: CERNER INNOVATION, INC., Kansas City, KS (US)

(72) Inventor: James D. Christen, Downingtown, PA (US)

(73) Assignee: CERNER INNOVATION, INC., Kansas City, KS (US)

( * ) Notice: Subject to any disclaimer, the term of this patent is extended or adjusted under 35 U.S.C. 154(b) by 533 days.

This patent is subject to a terminal disclaimer.

(21) Appl. No.: 15/630,086

(22) Filed: Jun. 22, 2017

(65) Prior Publication Data

US 2017/0352120 A1 Dec. 7, 2017

Related U.S. Application Data (63) Continuation of application No. 12/139,556, filed on Jun. 16, 2008, now Pat. No. 9,721,315.
(Continued)

(51) Int. Cl.
*G06Q 50/22* (2018.01)
*G06Q 10/10* (2012.01)

(52) U.S. Cl.
CPC ............. *G06Q 50/22* (2013.01); *G06Q 10/10* (2013.01)

(58) Field of Classification Search
None
See application file for complete search history.

(56) References Cited

U.S. PATENT DOCUMENTS 4,491,725 A 1/1985 Pritchard et al.
4,667,292 A 5/1987 Mohlenbrock et al.
(Continued)

FOREIGN PATENT DOCUMENTS

JP 11161704 A 6/1999

OTHER PUBLICATIONS

DeNovis, Inc., "Claims Administration", printed from website on Sep. 20, 2002 http://www.denovis.com/product/claims.htm.
(Continued)

*Primary Examiner* — Jonathan Ng
(74) *Attorney, Agent, or Firm* — Shook, Hardy & Bacon L.L.P.

(57) ABSTRACT

A system evaluates processing rules used for processing claim data related to reimbursement for provision of healthcare to a patient by specific payer organizations. The system includes at least one repository of information including first claim data. The first claim data processing rules and associated output data comprise first claim result information derived by applying the first claim data processing rules to the first claim data. The system also includes a source of a second claim data processing rule and a rules processor for applying the second claim data processing rule to the first claim data in deriving second claim result information corresponding to the first claim result information. A comparator compares the second claim result information with the first claim result information to identify changed result data elements and associated data fields in a claim form used in obtaining reimbursement in response to a claim. An output processor provides data representing a visual display image highlighting data fields associated with the changed result data elements.

20 Claims, 10 Drawing Sheets

Related U.S. Application Data (60) Provisional application No. 60/949,523, filed on Jul. 13, 2007.

(56) References Cited

U.S. PATENT DOCUMENTS

| | | | |
|---|---|---|---|
| 4,852,000 A | 7/1989 | Webb et al. | |
| 4,857,716 A | 8/1989 | Gombrich et al. | |
| 4,858,121 A | 8/1989 | Barber et al. | |
| 5,018,067 A | 5/1991 | Mohlenbrock et al. | |
| 5,077,666 A | 12/1991 | Brimm et al. | |
| 5,121,945 A | 6/1992 | Thomson et al. | |
| 5,191,522 A | 3/1993 | Bosco et al. | |
| 5,253,164 A | 10/1993 | Holloway et al. | |
| 5,307,262 A | 4/1994 | Ertel et al. | |
| 5,325,293 A | 6/1994 | Dorne et al. | |
| 5,359,509 A | 10/1994 | Little et al. | |
| 5,517,405 A | 5/1996 | McAndrew et al. | |
| 5,523,164 A | 6/1996 | Shibato et al. | |
| 5,550,734 A | 8/1996 | Tarter et al. | |
| 5,557,514 A | 9/1996 | Seare et al. | |
| 5,601,105 A | 2/1997 | Blen et al. | |
| 5,704,044 A | 12/1997 | Tarter et al. | |
| 5,704,371 A | 1/1998 | Shepard et al. | |
| 5,752,234 A | 5/1998 | Withers et al. | |
| 5,772,585 A | 6/1998 | Lavin et al. | |
| 5,790,674 A | 8/1998 | Houvener et al. | |
| 5,819,228 A | 10/1998 | Spiro et al. | |
| 5,835,897 A | 11/1998 | Dang et al. | |
| 5,867,821 A | 2/1999 | Ballantyne et al. | |
| 5,915,241 A | 6/1999 | Giannini et al. | |
| 5,924,074 A | 7/1999 | Evans et al. | |
| 5,933,809 A | 8/1999 | Hunt et al. | |
| 5,950,169 A | 9/1999 | Borghesi et al. | |
| 5,956,689 A | 9/1999 | Everhart, III et al. | |
| 5,974,389 A | 10/1999 | Clark et al. | |
| 5,991,733 A | 11/1999 | Aleia et al. | |
| 6,182,070 B1 | 1/2001 | Megiddo et al. | |
| 6,189,005 B1 | 2/2001 | Chakrabarti et al. | |
| 6,208,973 B1 | 3/2001 | Boyer et al. | |
| 6,262,330 B1 | 7/2001 | Fujisawa et al. | |
| 6,263,330 B1 | 7/2001 | Bessette | |
| 6,282,531 B1 | 8/2001 | Haughton et al. | |
| 6,317,783 B1 | 11/2001 | Freishtat et al. | |
| 6,336,139 B1 | 1/2002 | Feridun et al. | |
| 6,341,265 B1 | 1/2002 | Provost et al. | |
| 6,343,271 B1 | 1/2002 | Peterson et al. | |
| 6,345,288 B1 | 2/2002 | Reed et al. | |
| 7,006,893 B2 | 2/2006 | Hart et al. | |
| 7,013,284 B2 | 3/2006 | Guyan et al. | |
| 7,072,842 B2 | 7/2006 | Provost et al. | |
| 7,127,456 B1 | 10/2006 | Brown et al. | |
| 7,392,471 B1 | 6/2008 | Ford et al. | |
| 7,801,744 B2 | 9/2010 | Patterson | |
| 7,831,442 B1 | 11/2010 | Chappel | |
| 7,870,009 B2 | 1/2011 | Patterson | |
| 7,881,950 B2 | 2/2011 | Patterson | |
| 2001/0034618 A1 | 10/2001 | Kessler et al. | |
| 2001/0037224 A1 | 11/2001 | Eldridge et al. | |
| 2001/0054155 A1 | 12/2001 | Hagan et al. | |
| 2002/0004727 A1 | 1/2002 | Knaus et al. | |
| 2002/0010597 A1 | 1/2002 | Mayer et al. | |
| 2002/0019754 A1 | 2/2002 | Peterson et al. | |
| 2002/0032583 A1 | 3/2002 | Joao | |
| 2002/0032584 A1 | 3/2002 | Doctor et al. | |
| 2002/0035488 A1 | 3/2002 | Aquila et al. | |
| 2002/0120473 A1 | 8/2002 | Wiggins | |
| 2002/0133503 A1 | 9/2002 | Amar et al. | |
| 2002/0147867 A1 | 10/2002 | Sallow | |
| 2002/0198741 A1 | 12/2002 | Randazzo | |
| 2003/0014280 A1 | 1/2003 | Jilinskaia et al. | |
| 2003/0018496 A1 | 1/2003 | Hambright et al. | |
| 2003/0050804 A1 | 3/2003 | Hendershot et al. | |
| 2003/0055679 A1 | 3/2003 | Soll et al. | |
| 2003/0069760 A1 | 4/2003 | Gelber | |
| 2003/0083906 A1 | 5/2003 | Howell et al. | |
| 2003/0149594 A1 | 8/2003 | Beazley et al. | |
| 2003/0158760 A1 | 8/2003 | Kannenberg | |
| 2003/0191665 A1 | 10/2003 | Fitzgerald et al. | |
| 2003/0191667 A1 | 10/2003 | Fitzgerald et al. | |
| 2003/0191669 A1 | 10/2003 | Fitzgerald et al. | |
| 2003/0208379 A1 | 11/2003 | Haskey et al. | |
| 2003/0216831 A1 | 11/2003 | Hart et al. | |
| 2003/0229516 A1 | 12/2003 | Nickerson | |
| 2004/0078228 A1 | 4/2004 | Fitzgerald et al. | |
| 2004/0153336 A1 | 8/2004 | Virdee et al. | |
| 2005/0010452 A1 | 1/2005 | Lusen | |
| 2005/0010597 A1 | 1/2005 | Potter et al. | |
| 2005/0010863 A1 | 1/2005 | Zernik | |
| 2005/0033609 A1 | 2/2005 | Yang | |
| 2005/0137912 A1 | 6/2005 | Rao et al. | |
| 2005/0216315 A1 | 9/2005 | Andersson | |
| 2006/0008142 A1 | 1/2006 | Steinberg | |
| 2006/0041487 A1 | 2/2006 | Santalo et al. | |
| 2006/0080142 A1 | 4/2006 | Hart et al. | |
| 2006/0149784 A1 | 7/2006 | Tholl et al. | |
| 2006/0150107 A1 | 7/2006 | Leung et al. | |
| 2008/0027759 A1 | 1/2008 | Flam et al. | |
| 2014/0058757 A1 | 2/2014 | Patterson | |

OTHER PUBLICATIONS

Yang et al., "Selecting Structural Patterns for Classification", Proceedings of the 38th Hawaii International Conference on System Sciences—2005.

International Search Report received for PCT Patent Application No. PCT/US2003/010191, dated Nov. 19, 2003, 2 pages.

Non-Final Office Action received for U.S. Appl. No. 12/139,556, dated Mar. 16, 2011, 15 pages.

Narrow Ridge General Hosp
1101 Main Street
Phoenixville, PA, 19460
111-555-1001 x1001111-555

SRN9470
10000379
111
240799343  010604  010604

PATIENT NAME: Smith, test 1129 O
PATIENT ADDRESS: 1312 Shunk St  Phila  PA  19148  US 01011970  2  010604  09  3  3  14  01  20  24  23  26  30  28  32  22

| Code | Date | Code | Date | Code | Date | Code | Date |
|---|---|---|---|---|---|---|---|
| A1 | 010170 | A2 | 010102 | B1 | 010102 | B2 | 010170 |
| C1 | 010170 | 11 | 010170 | 18 | 010170 | 34 | 010170 |

71  092702  093002

Test Revcode
1312 Shunk St

Phila, PA. 19148

| Code | Amount | Code | Amount | Code | Amount |
|---|---|---|---|---|---|
| 37 | 1 | 40 | 500 | 42 | 1000 |
| 23 | 1500 | 05 | 2000 | 06 | 2500 |
| 13 | 3000 | 15 | 3500 | 57 | 1 |
| 60 | 1 | 39 | 1 | D3 | 10585 |

| 42 REV CD | 43 DESCRIPTION | 44 HCPCS/RATES/HIPPS CODE | 45 SERV DATE | 46 SERV UNITS | 47 TOTAL CHARGES | 48 NON-COVERED CHARGES |
|---|---|---|---|---|---|---|
| 480 | VIRAL PNEUMONIA | 93350 | 010604 | 6 | 270000 | 33300 |
| 001 | Broken Thumb | | | 0 | 270000 | 000 |
| 003 | Wrist Fracture | | | 1 | 300 | 000 |
| 004 | | | | 1 | 400 | 000 |
| 005 | | | | 1 | 500 | 000 |
| 006 | Tooth fix | | | 1 | 600 | 000 |
| 007 | Hair Split | | | 2 | 700 | 000 |
| 008 | Ear Dripping | | | 1 | 800 | 000 |
| 009 | Broken Jaw | | | 9 | 900 | 000 |
| 010 | Nose Bleeding | | | 1 | 1000 | 000 |
| 011 | Eye pain | | | 1 | 1100 | 000 |
| 012 | Cardiac Surgery | | | 4 | 1200 | 000 |
| 013 | Brain Damage | | | 6 | 1300 | 000 |
| 014 | Lyme | | | 4 | 1400 | 000 |
| 015 | Rhuematism | | | 0 | 1500 | 000 |
| 016 | Arthritis | | | 5 | 1600 | 000 |
| 017 | knee pain | | | 2 | 1700 | 000 |
| 018 | back pain | | | 1 | 1800 | 000 |
| 020 | headache | 020 | | 1 | 1900 | 000 |
| 021 | Indigestion | | | 1 | 2000 | 000 |
| 021 | Congestion | | | 3 | 2100 | 000 |
| 022 | Hay fever | | | 1 | 2200 | 000 |

PAGE 1 OF 3    CREATION DATE 020604    TOTALS  565000    33300

| 50 PAYER NAME | 51 HEALTH PLAN ID | NO. | 54 PRIOR PAYMENTS | 55 EST AMOUNT DUE |
|---|---|---|---|---|
| Cigna Dental | | Y  N | 000 | 000 |
| Cigna Dental | | Y  N | 000 | 000 |
| Cigna Dental | | Y  N | 000 | 000 |

| 58 INSURED'S NAME | 59 INSURED'S UNIQUE ID | 61 GROUP NAME | 62 INSURANCE GROUP NO. |
|---|---|---|---|
| Regression, Test10 | 1 | | 8888 |
| Regression, Test10 | 1 | | 8888 |
| Regression, Test10 | 1 | | 8888 |

| 63 TREATMENT AUTHORIZATION CODES | 64 DOCUMENT CONTROL NUMBER | 65 EMPLOYER NAME |
|---|---|---|
| 233424879 | | 5555 |
| 233424879 | | 5555 |
| 233424879 | | 5555 |

E907.2  003.21  021.0  174.21  521.8  E999.1  V57.21  998.51  E807.0

114.1   E807.2

| PRINCIPLE PROCEDURE | OTHER PROCEDURE | OTHER PROCEDURE | 76 ATTENDING NPI | QUAL Uploth000 |
|---|---|---|---|---|
| 00 55  010103 | 00 56  010203 | 00 57  010303 | LAST Agney | FIRST Dominic |
| | | | 77 OPERATING NPI | QUAL Uploth000 |
| | | | LAST Performing | FIRST Dominic |
| 80 REMARKS | | | 78 OTHER NPI | QUAL Uploth000 |
| | | | LAST Other | FIRST Dominic |
| | | | 79 OTHER | |

```
ISA*00*
*ZZ*123456789012345*ZZ*123456789012345*070510*1120*U*00401*000000371*1*
P*:~
GS*HC*123456789012345*123456789012345*20070510*1120*1327*X*004010X096A1
~
ST*837*XYZ113001~
BHT*0019*00*ABC*20070510*1120*CH~
REF*87004010X096A1~
NM1*41*2*ABC*20070510*1120*CH~
REF*87*004010X096A1~
NM1*41*2ABC MEMORIAL HOSPITAL*****SUBMITTERID~
PER*IC*SUBMITTER CONTACT*TE*5558595777~
NM1*40*2*PAYER OPEN ACCESS*****46*88888~
HL*2*1*22*1~
NM1*85*2*ABC MEMORIAL HOSPITAL*****XX*9999998432~
HL*2*1*22*1~
SBR*P**3207020******CI~
NM1*IL*1*BIXBY*SANDRA*L***MI*U0999991903~
N3*4255 XYZ DRIVE D~
N4*NOWHERE*TX*99997*US~
DMG*D8*19891103*F~
CLM*SRN999999*3465.10***13:A:1*Y**Y*Y********Y~
DTP*434*RD8*20061217-20061218~
DTP*435*DT*200612172225~
CL*1*7*01~
AMT*F3*0.00~
REF*EA*7006345~
NTE*ADD*AIB          ER SERVICES          PPO~
HI*BK:592.1~
HI*BF:591*BF:314.01~
HI*BH:11:D8:20061217~
HI*BE:A3:::2772.08~
NM1*71*1*FANELLI*CLAUDIO****24*999994461~
REF*G2*09993~
REF*1G*C09993~
NM1*FA*2*ABC HOSPITAL****24*34999461~
```

FIG. 5

```
ISA*00*          *00*
*ZZ*123456789012345*ZZ*123456789012345*070510*1120*U*00401*000000371*1*
P*:~
GS*HC*123456789012345*123456789012345*20070510*1120*1327*X*004010X096A1
~
ST*837*XYZ113001~
BHT*0019*00*ABC*20070510*1120*CH~
REF*87004010X096A1~
NM1*41*2ABC MEMORIAL HOSPITAL*****46*SUBMITTERID~
PER*IC*SUBMITTER CONTACT*TE*5558595777~
NM1*40*2*PAYER OPEN ACCESS*****46*88888~
HL*1**20*1~
NM1*85*2*ABC MEMORIAL HOSPITAL*****XX*9999998432~
HL*2*1*22*1~
SBR*P**3207020******:*CI~
NM1*IL*1*BIXBY*SANDRA*L***MI*U0999991903~
N3*4255 XYZ DRIVE D~
N4*NOWHERE*TX*99997*US~
DMG*D8*19891103*F~
CLM*SRN999999*3465.10***13:A:1*Y**Y*Y*********Y~
DTP*434*RD8*20061217-20061218~
DTP*435*DT8*20061217225~
CL*1*7*01~
AMT*F3*0.00~
REF*EA*7006345~
NTE*ADD*AIB            ER SERVICES           PPO~
HI*BK:592.1~
HI*BF:591*BF:314.01~
HI*BH:11:D8:20061217~
HI*BE:A3:::2772.08~
NM1*71*1*FANELLI*CLAUDIO****24*999994461~
REF*G2*09993~
REF*1G*C09993~
NM1*72*1*SYDNEY*MARIA*KAY****24*999994461~
REF*G2*04999~
REF*1G*C09990~
NM1*72*2*ABC HOSPITAL*****24*34999461~
```

603 — REF*1G*C09993~
605 — REF*G2*04999~
607 — NM1*72*2*ABC HOSPITAL

CLAIM PROCESSING VALIDATION SYSTEM

CROSS REFERENCE TO RELATED APPLICATIONS

This is a continuation of co-pending U.S. patent application Ser. No. 12/139,556, filed Jun. 16, 2008, entitled "Claim Processing Validation System," which claims priority to U.S. Provisional Application No. 60/949,523 filed Jul. 13, 2007, entitled "Claim Processing Validation System," the entire contents of which are incorporated herein by reference in their entirety.

FIELD OF THE INVENTION

This invention concerns a system for evaluation of rules used for processing claim data related to reimbursement for provision of healthcare to a patient by specific payer organizations involving comparing results of claim processing using different rules.

BACKGROUND OF THE INVENTION

A healthcare provider organization that provides a patient with healthcare services (e.g., diagnostic X-Ray), sends claim information to a payer organization (e.g., a patient medical insurer) with a request for reimbursement. A payer organization requires formatting the claim information in a specific format using rules and guidelines provided by standards groups, such as ANSI (American National Standards Institute) X12 standards for EDI (Electronic Data Interchange) transactions or associated with a UB04 transaction form from the NUBC (National User Billing Committee), for example. A payer organization may require change of a mandatory format of a claim transaction form so that a number of versions of claims transactions and claims forms exist that are tailored to requirements of a payer organization. The customization of a claim transaction form having a standard format is burdensome especially if a format change is required. A payer organization may require different information for specific fields, depending on provided hospital services, for example and involve payer organization specific rule changes. Further, during implementation of such changes to correct billing programs, a payer organization may reject incomplete claims which causes cash flow delays to a healthcare provider.

Known systems support limited validation of claim transaction processing rules and are hampered by restrictions in assessing the effect of processing rule changes on claim data. Some known systems provide a facility for format certification, however, a claim that passes such certification may not be valid and compatible with specific payer organization rules, because the format certification verification process is not capable of sophisticated reimbursement calculations and format takes precedence over associated operation instruction. Known systems are typically not capable of calculating reimbursement and submitting processed data as claims forms or as EDI transactions without adversely compromising a regular claims production system. A system according to invention principles addresses these deficiencies and related problems.

SUMMARY OF THE INVENTION

A Claims Validation System (CVS) evaluates the effect of changing claim generation rules on claim reimbursement and corrects identified problems prior to implementing the rules into a production system and enables visual indication of the effect of proposed rule adaptations in processing test claim data. A system evaluates processing rules used for processing claim data related to reimbursement for provision of healthcare to a patient by specific payer organizations. The system includes at least one repository of information including first claim data. The first claim data processing rules and associated output data comprise first claim result information derived by applying the first claim data processing rules to the first claim data. The system also includes a source of a second claim data processing rule and a rules processor for applying the second claim data processing rule to the first claim data in deriving second claim result information corresponding to the first claim result information. A comparator compares the second claim result information with the first claim result information to identify changed result data elements and associated data fields in a claim form used in obtaining reimbursement in response to a claim. An output processor provides data representing a visual display image highlighting data fields associated with the changed result data elements.

BRIEF DESCRIPTION OF THE DRAWINGS

FIGS. 3 and 4 illustrate UB04 claim reimbursement forms prepared using first and second different sets of claim processing rules based on a common set of input claim data, according to invention principles.

FIGS. 8 and 9 illustrate a particular claim reimbursement form prepared using first and second different sets of claim processing rules based on a common set of input claim data, according to invention principles.

DETAILED DESCRIPTION OF THE INVENTION

A Claims Validation System (CVS) according to invention principles, automatically evaluates the effect of changing claim data processing and claim form completion and generation rules prior to implementation of the rules in a production (non-test) environment. The system identifies and highlights changes in claim data and changes in data in a prepared form to facilitate user identification of the changes. The system in one embodiment is isolated and independent from a production claims system and is provided as an Application Service Provider (ASP) system or as a stand-alone system, for example. The system includes components that code and validate rules for processing electronic transactions and data reproduced in the form of a paper claim. System components are nested and the system supports subscribers or users generating new rules to supplement or override model rules. The system produces output comprising Electronic Data Interchange (EDI) compatible claim transaction data or data representing test claims in paper form for use in validating a rule change without affecting an accounts receivable process and addresses the problem of determining rule change effect on claims reimbursement, for example.

The Claims Validation System displays claim data in a layout that visually highlights changes to a payer organization standard claim format resulting from proposed adaptations to healthcare payer organization rules. The Claims Validation System automatically compares a proposed output format (paper claims or EDI transactions) to a number of prior versions of formats using an intuitive Graphical User Interface (GUI). Changes from a prior claim format version are automatically highlighted (e.g., in yellow or by another visual attribute) in a displayed newer version. The system uses patient claim data edited to remove patient demographic information and patient identifying information, to test the effect of claim processing rule changes. Sample claims are chosen from one or more different sources including sources of, random samples of claims from current claim production or from a catalog of claims that represent special cases containing complex claim reimbursement parameters. Either a single claim or a group of claims is selected for use in rule change evaluation to validate the effect of rule change. The system isolates and protects model payer organization rules (as "read only/do not change") from healthcare provider organization alteration. For this purpose, the system isolates a payer organization from rules created or altered by a healthcare provider organization. In performing a rule change validation, the system integrates use of both payer organization and healthcare provider organization rules in a correct sequence to perform validation according to a reimbursement schema. Further, the system simulates integrated system performance (throughput) of claims to predict computer system resource needs required to support a rule change. A trace log indicating individual rule execution in processing a claim, is performed for use in determining a sequence in which rules are executed to produce a claim or EDI transaction, for example.

A processor as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example. A processor may be electrically coupled to any other processor enabling interaction and/or communication therebetween. A display processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps (e.g., of FIG. 10) herein may be performed automatically or wholly or partially in response to user command. An activity (including a step) performed automatically is performed in response to executable instruction or device operation without user direct initiation of the activity. Workflow comprises a sequence of tasks performed by a device or worker or both. An object or data object comprises a grouping of data, executable instructions or a combination of both or an executable procedure.

Figure 1:
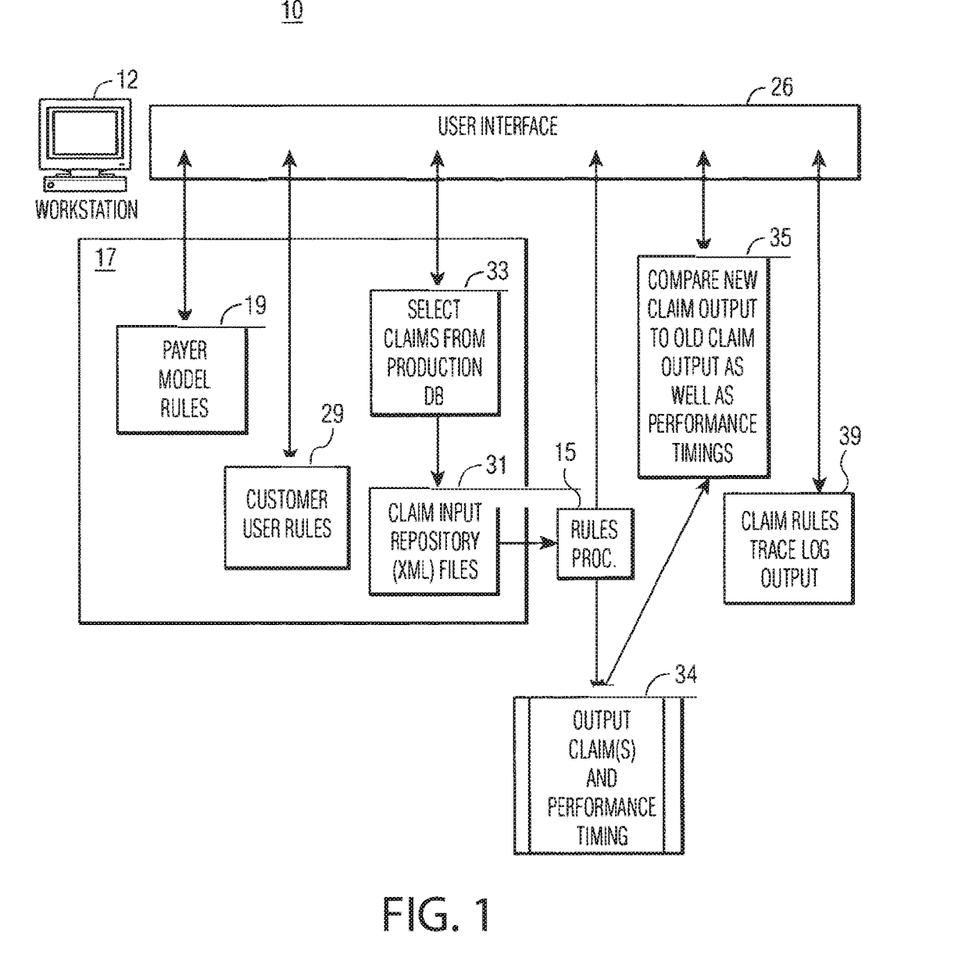
FIG. 1 shows a system for evaluating processing rules used for processing claim data related to reimbursement for provision of healthcare to a patient by specific payer organizations, according to invention principles.

FIG. 1 shows system 10 for evaluating processing rules used for processing claim data related to reimbursement for provision of healthcare to a patient by specific payer organizations. System 10 includes a processing device (e.g., workstation or portable device such as a notebook, Personal Digital Assistant, cell phone) 12, at least one repository 17 and a user interface 26. User interface 26 provides a Graphical User Interface (GUI) that links together a file and folder structure that stores both input claim data in XML format and output form data in Word document format, and employs executable procedures to manipulate and produce these files. In one embodiment, each input and output file references one claim. User interface 26 provides data representing display images for presentation on processing device 12. At least one repository 17 includes information including first claim data 33, first claim data processing rules 19, 29 and associated output data comprising first claim result information derived by applying the first claim data processing rules to the first claim data.

Repository 17 also includes a source of a second claim data processing rule comprising a new claim data processing rule or an adapted (e.g., edited) existing claim data processing rule derived or entered via user interface 26, for example. Rules processor 15 applies the second claim data processing rule (in conjunction with rules of said first claim data processing rules) to the first claim data in deriving second claim result information corresponding to the first claim result information. Comparator 35 compares the second claim result information with the first claim result information to identify changed result data elements and associated data fields in a claim form used in obtaining reimbursement in response to a claim. Output processor 34 provides data representing a visual display image highlighting data fields associated with the changed result data elements. Trace processor 39 provides data representing a trace of execution of rules including the second claim data processing rule applied in processing the first claim data enabling a user to verify the second claim data processing rule has been executed.

In operation, a user makes a rule change involving updating appropriate code that implements a rule, in an integrated development environment (IDE). The user employs a GUI display image provided by user interface 26 to select a saved claim or claims from an input claims directory 33 (converted to XML format and stored in repository 31) for processing with updated (changed) claim data processing rules. Validation of the changed claim data processing rules is initiated in response to user selection of a button in the GUI and a resultant output form document provided by output processor 34 is automatically named and stored in an output form directory in unit 34. The GUI provided by user interface 26 allows a user to compare, claim data processed using current changed processing rules and presented in a form, with any saved previous claim data form output derived from the output form directory in unit 34. Comparator 35 incorporates a default comparison function for comparing a latest previously processed claim form output with a corresponding claim form output provided using an earlier version of claim processing rules derived using the same input claim data or input claim data for each claim in a group of claims. Rules processor 15 automatically searches for a previously processed claim form output based on a file naming convention. The compared output is displayed to a user in the GUI. The file naming convention comprises, for an input claim data file, INPUT <user supplied unique name>.xml (e.g., UB04 BCBS.xml), a corresponding OUTPUT is <INPUT unique name>_<generated date timestamp>.doc (e.g., UB04 BCBS_20070710_130216.doc).

System 10 displays claim processing validation results and automatically compares a latest claim form output with previously processed claim form output. The system highlights changed elements in a form and records duration times of claim data processing execution. After one or more iterations of claim data processing, there is enough information to validate changed processing rules, prior to incorporating the changed rules into a non-test production system. The validation process uses a consistent set of sample claims data derived from unit 33. System 10 automates the validation of a change in claim data processing payer organization rules enabling a user to verify whether a rule change operated as desired and whether there were unintended undesirable consequences. A user is able to readily select exemplary input claim data cases to verify processing of relevant claim data form type and payer organization claim data, for example, prior to a validation test. Input claim data is selectable from a current production claim database or from a prior group of saved claims in database 33. Use of a large sample of claims ensures that modified rules are "production ready" and that performance throughput is sustained. Trace log processor 39 enables an error be traced to a particular source claim data processing rule.

In one embodiment the claim data processing payer organization rules reside in a remote third party rules engine accessed via a network (as an alternative to database 19) or in another location in another embodiment, accessed via an integrated development environment (IDE). Model payer organization rules in unit 19 are "read-only" and updated periodically in response to received update data from payer organizations. User (customer) organization rules in database 29 are created and maintained by a user organization.

System 10 employs model payer organization rules in unit 19 and user organization rules in unit 29 in a particular sequence compatible with payer organization requirements to validate a proposed change to claim data processing rules. Selected claims incorporating claim data derived from Production claims database 33 are transformed into an XML format and placed into repository 31 for validation. Repository 31 of XML claim data is used as a database of examples to validate proposed changes.

Figure 2:
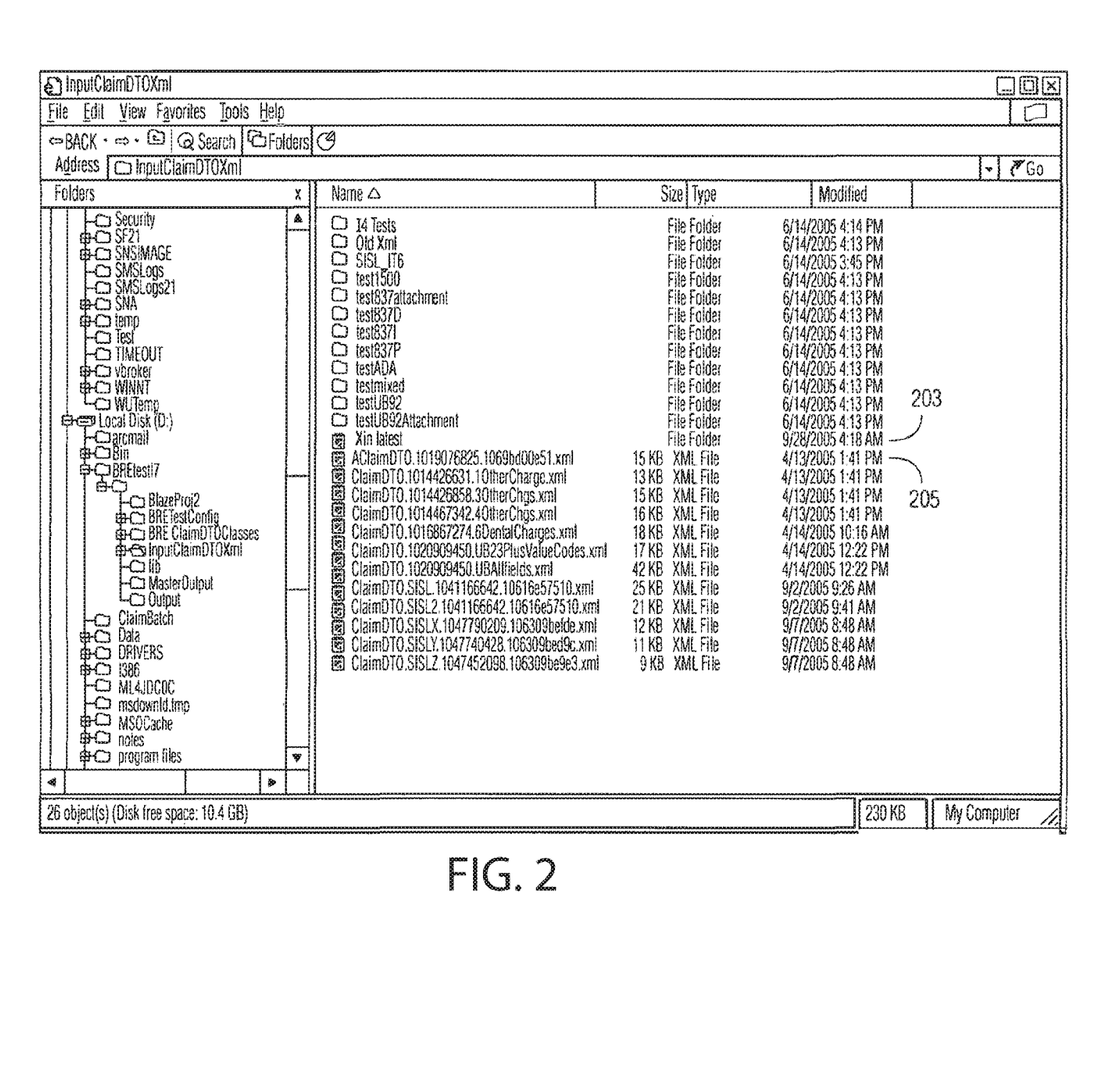
FIG. 2 shows a user interface display image illustrating a list of XML claim data files used to evaluate effect of change in claim processing rules, according to invention principles.

FIG. 2 shows a user interface display image illustrating a list of XML claim data files, e.g., files 203 and 205 in repository 31 used to evaluate an effect of a change in payer organization and user specific claim processing rules. Repository 31 contains many different types of claims, including those for Medicare, Medicaid, and specific payer organizations. System 10 also includes an XML editor enabling a user to edit claim data to be used in testing changed claim processing rules to meet testing parameters. In this way, results of multiple different test cases are acquired and stored in repository 17 for consistent long-term regression testing.

In system 10 (FIG. 1), rules processor 15 initiates validation of changed claim processing rules in response to user selection of one or more claims in XML claims repository 31 via a claim selection display image provided in a web browser by user interface 26 on workstation 12. Rules processor 15 processes the selected claims with a changed version of one or more rules of either, or both, payer organization rules (e.g., required by payer organization standards) and any user organization specific or user organization customized rules. Processed claim output data is generated in XML format and stored in an output file directory in repository 17. Rules processor 15 determines duration times of claim processing execution and associates data representing the determined times with data identifying corresponding rules processed in a repository in order to support evaluation of performance of claim processing throughput. Comparator 35 automatically compares a latest claim form output with a previously processed corresponding claim form output using the same input claim data and the system highlights changed elements (e.g., in yellow) in a form. The process of validating a changed claim processing rule consistently uses the same sample input claims data and system 10 displays results of validation processing via user interface 26 on workstation 12.

Figure 3:
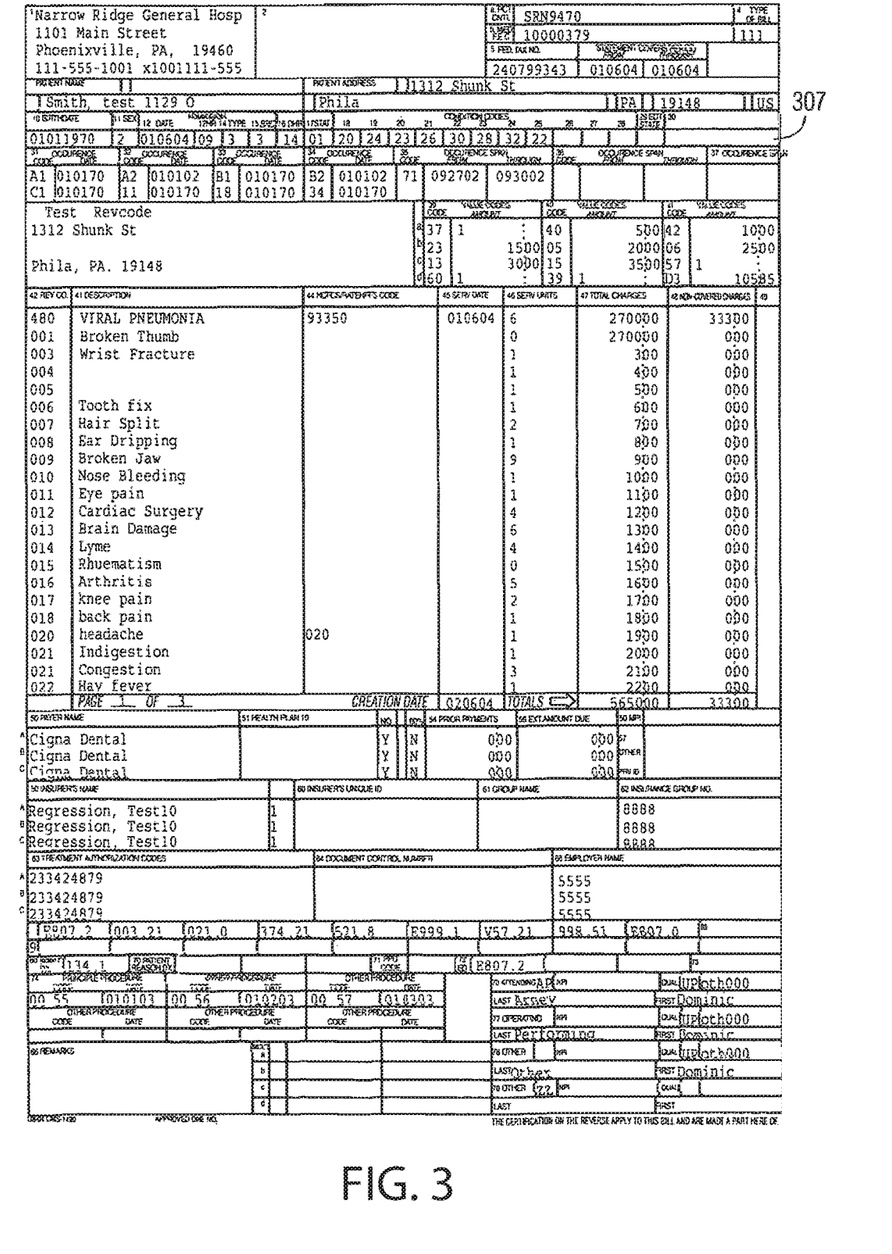

FIGS. 3 and 4 illustrate UB04 claim reimbursement forms prepared using system 10 employing first and second different sets of claim processing rules based on a common set of input claim data. Specifically, FIG. 4 highlights (e.g., in yellow or with any other visual attribute) changed condition codes in row 307 of a UB04 claim reimbursement form derived using a second set of claim processing rules including payer organization specific rules and user organization specific rules. FIG. 4 illustrates that the second set of rules change condition codes in locations identified by Form Locators 19, 21, 22, 23, 24, 25 on the UB04 claim reimbursement form. The highlighted differences indicate the condition codes of FIG. 4 are now in an ascending sort sequence order enabling a user to readily determine the desired change has been successfully implemented. Comparator 35 automatically identifies and highlights the changed codes following processing of the common set of input claim data by rules processor 15. FIG. 3 illustrates corresponding previous condition codes in row 303 of a corresponding UB04 claim reimbursement form derived using a first set of claim processing rules including payer organization specific rules and user organization specific rules. The second set of claim processing rules are derived by changing, deleting, updating or replacing one or more rules of the first set of claim processing rules. Rules processor 15 also determines (and highlights in a display) the duration of execution of the claim processing rules involved in deriving the FIG. 3 and FIG. 4 UB04 claim reimbursement forms. Specifically, the FIG. 4 UB04 claim reimbursement form derived using the second set of claim processing rules, is produced in 105 milliseconds and the FIG. 3 UB04 claim reimbursement form derived using the first set of claim processing rules, is produced in 101 milliseconds.

Figure 5:
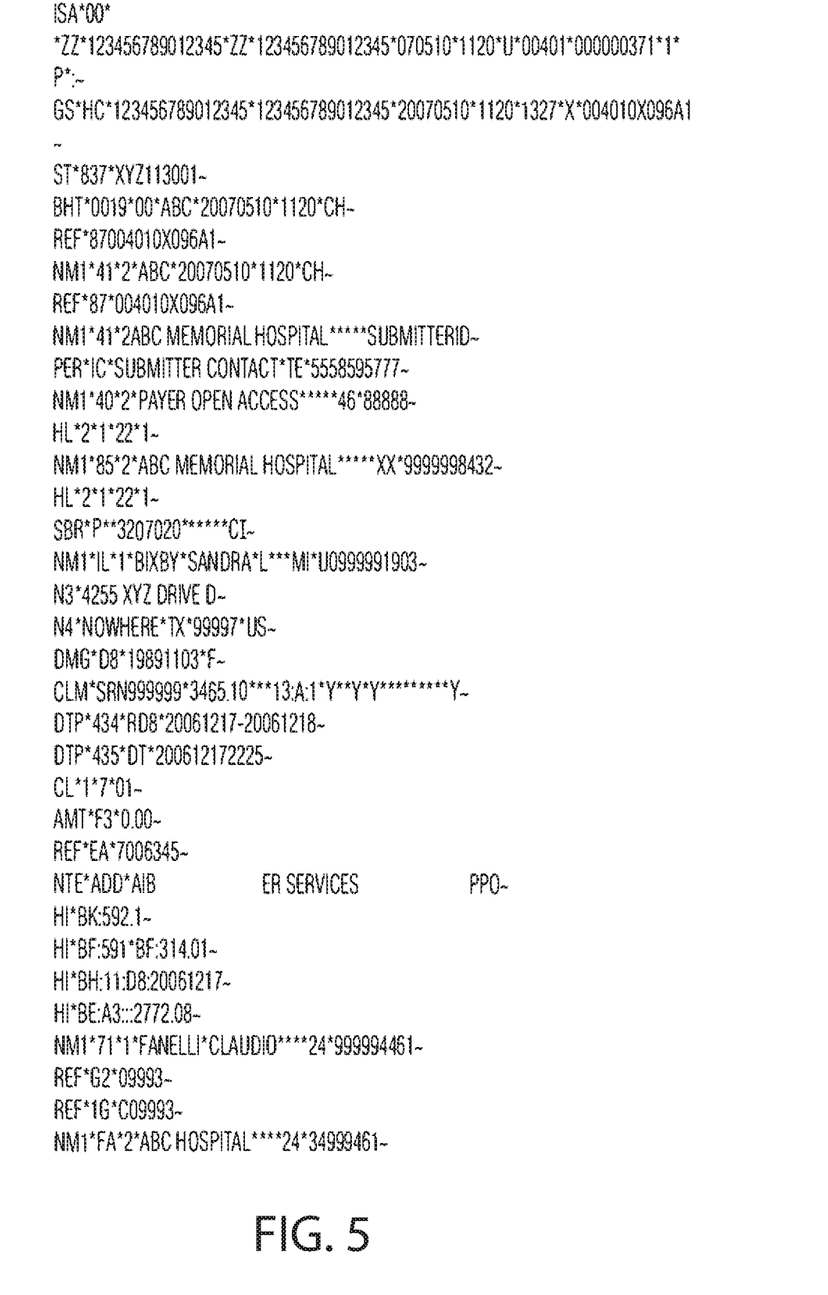
FIGS. 5 and 6 illustrate first and second different sets of claim processing rules used for processing a common set of input claim data to provide different claim reimbursement form data fields, according to invention principles.
Figure 6:
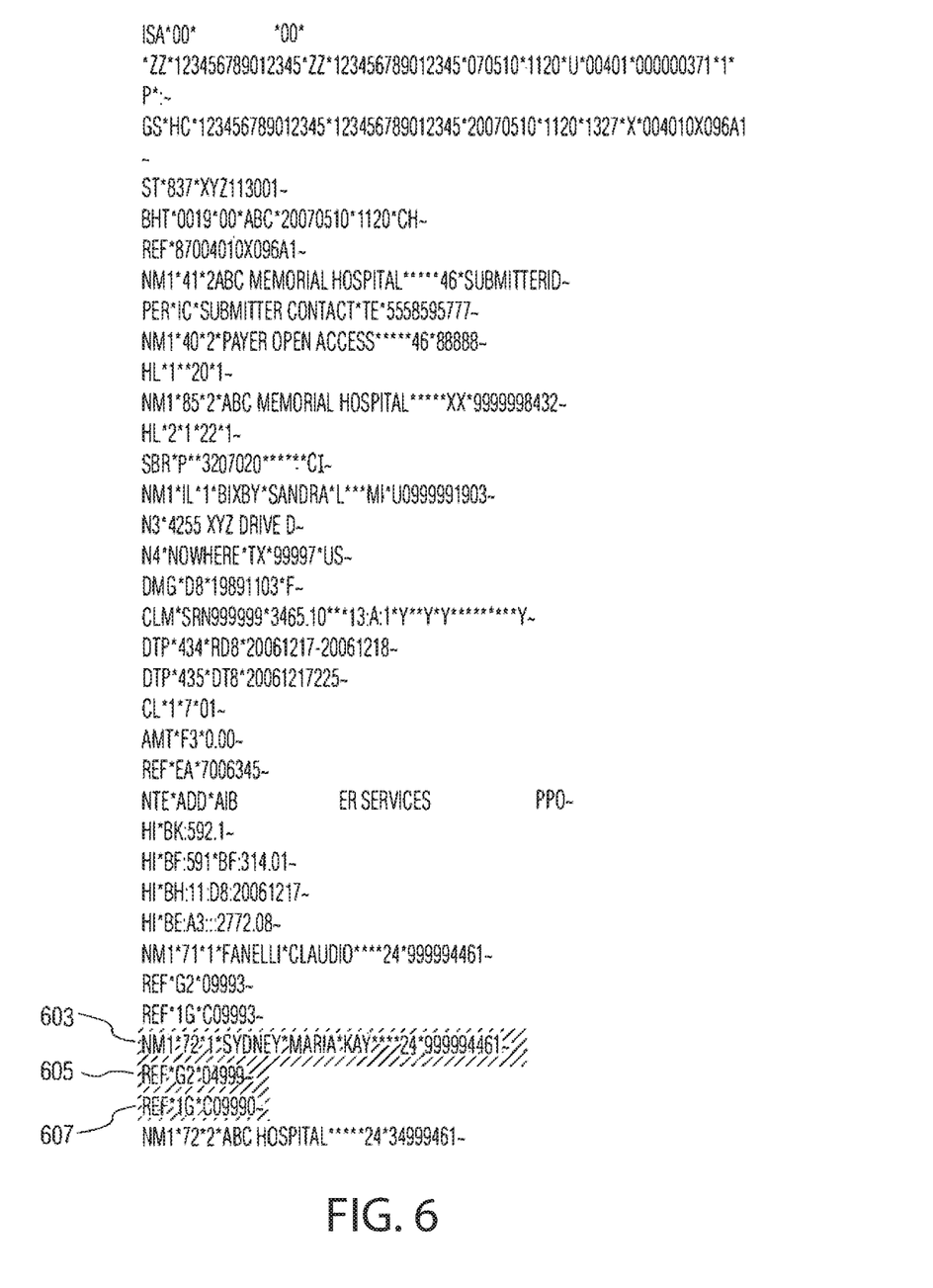

FIGS. 5 and 6 illustrate first and second different sets of claim processing rules used for processing a common set of input claim data to provide different claim reimbursement form data fields. Specifically, FIG. 6 illustrates the addition of rules on rows 603, 605 and 607 to the rules of FIG. 5 and used for processing EDI 8371 compatible claim transaction data. The added rules incorporate an operating physician (NM1 segment) together with associated reference (REF) segments, after an attending physician segment, to a claim transaction form. Rules processor 15 and comparator 35 of system 10 (FIG. 1) perform validation and initiate a form display highlighting form changes verifying rule changes work as desired. Rules processor 15 further determines that processing claim input data with the rules of FIG. 5 takes 76 milliseconds to process one claim input transaction and 201123 milliseconds (100.56 milliseconds per claim) to process the same claim input transaction 2000 times. In comparison, rules processor 15 further determines that processing claim input data with the rules of FIG. 6 takes 75 milliseconds to process the same claim input transaction and 198722 milliseconds (99.36 milliseconds per claim) to process the same claim input transaction 2000 times. Duration of rules execution for claim input data varies greatly for a number of reasons, such as start up time, time to set up execution or execution on disparate computer hardware. For example, the processing of the single set of claim input data 2000 times using the FIG. 5 rules compares unfavorably (201123 versus 198722 milliseconds) to using the proposed rule change embodied in the rules of FIG. 6.

In contrast, the rules of FIG. 5 take 352753 milliseconds (81.66 milliseconds per claim) to process different claim input transactions 4320 times and the rules of FIG. 6 take 370012 milliseconds (85.65 milliseconds per claim) to process different claim input transactions 4320 times. Therefore, the processing of the different sets of claim input data 4320 times using the FIG. 5 rules compares favorably (352753 versus 370012 milliseconds) to using the proposed rule change embodied in the rules of FIG. 6. The determination of duration of rules processing by processor 15 is advantageous in an Application Service Provider (ASP) environment involving processing of large numbers (e.g., tens of thousands of claims) as it provides a reliable performance predictor.

Figure 7:
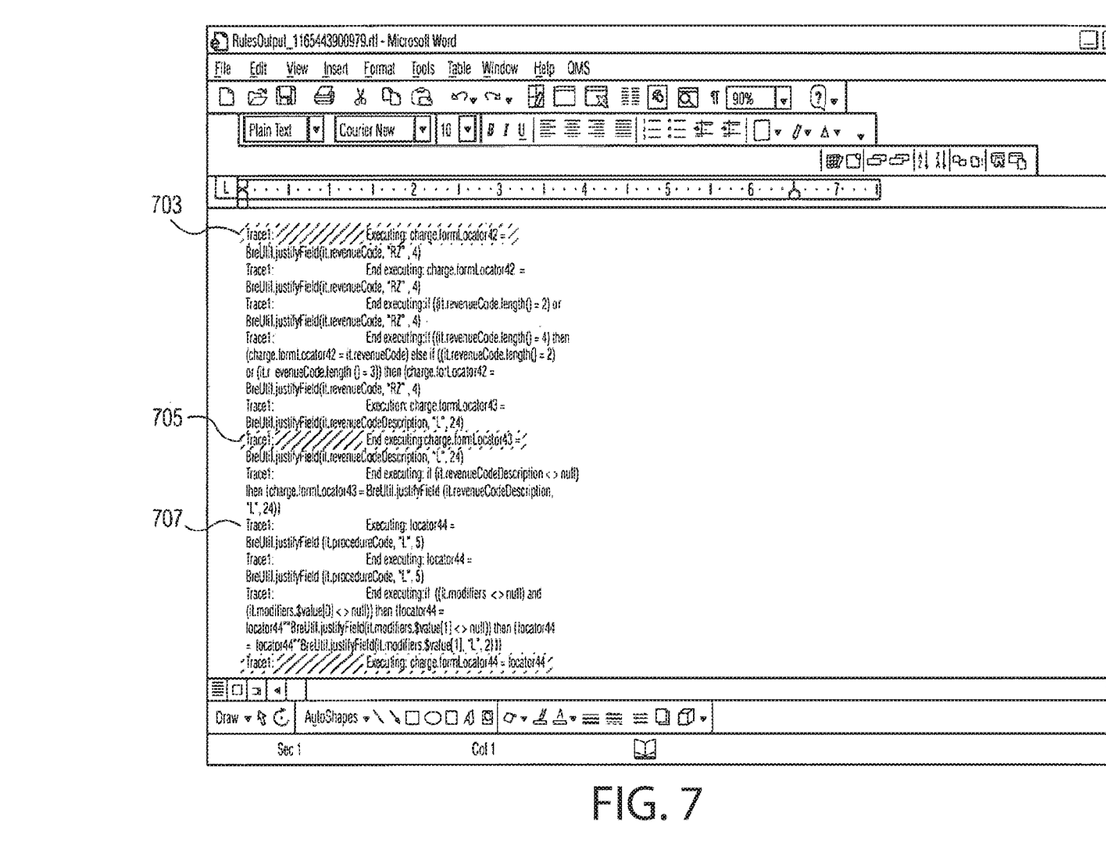
FIG. 7 shows a partial trace log recording execution of rules in claim data processing, according to invention principles.

Trace log processor 39 (FIG. 1) provides a log that traces and records execution of claim processing rules processing claim data in a UB92 form to aid in debugging problems indicated in claim form data changes, for example. The log also indicates the sequence in which rules are executed to aid in problem identification. FIG. 7 shows a partial trace log recording a sequence of execution of rules in claim data processing including recording execution of rules beginning in rows 703, 705 and 707. Specifically, the diagnostic trace log indicates that rules for charge.formLocator42, charge.formLocator43, and charge.formLocator44 are executed in sequence as illustrated beginning in rows 703, 705 and 707 respectively.

System 10 (FIG. 1) enables an individual user to regression test validation of rule changes using claim input data saved in XML format in database 31. The claims in repository 31 cover the spectrum of examples of forms and transactions needed to validate the impact of rule changes. Output data of a regression test indicates differences associated with rule changes in terms of form and transaction logic changes and run time differences. A trace log provided by trace processor 39 indicates a problem caused by one or more rules failing to execute. System 10 advantageously eliminates a need to validate processing rules in a (non-test) production environment with the attendant risk of compromising processing of real claims and negatively impacting hospital revenue collection, for example. System 10 is usable in conjunction with insurance payer claims adjudication applications, for example and advantageously includes a large sample of input claims supporting rule processing validation.

In operation, Regular Hospital USA is notified of a change to Box 38 for Payer1 Healthcare UB04 claims. Payer1 wants a particular address to show in Box 38 on the UB04 form for radiation therapy claims. A user from Regular Hospital USA has access to the rules that produce the UB04 in system 10. The user copies the rule that handles Box 38 and changes it so that the UB04 form for Payer1 Healthcare includes the particular address whenever the claim contains a service line for radiation therapy. The user tests the change using a number of input test claims as test cases. After testing the rule change on a dozen test claims, for example, a user readily verifies that Box 38 change is the only change that occurs and only for a UB04 form destined to be sent to the Payer1 organization. The validated rule change is provided to a production claim processing system.

Figure 8:
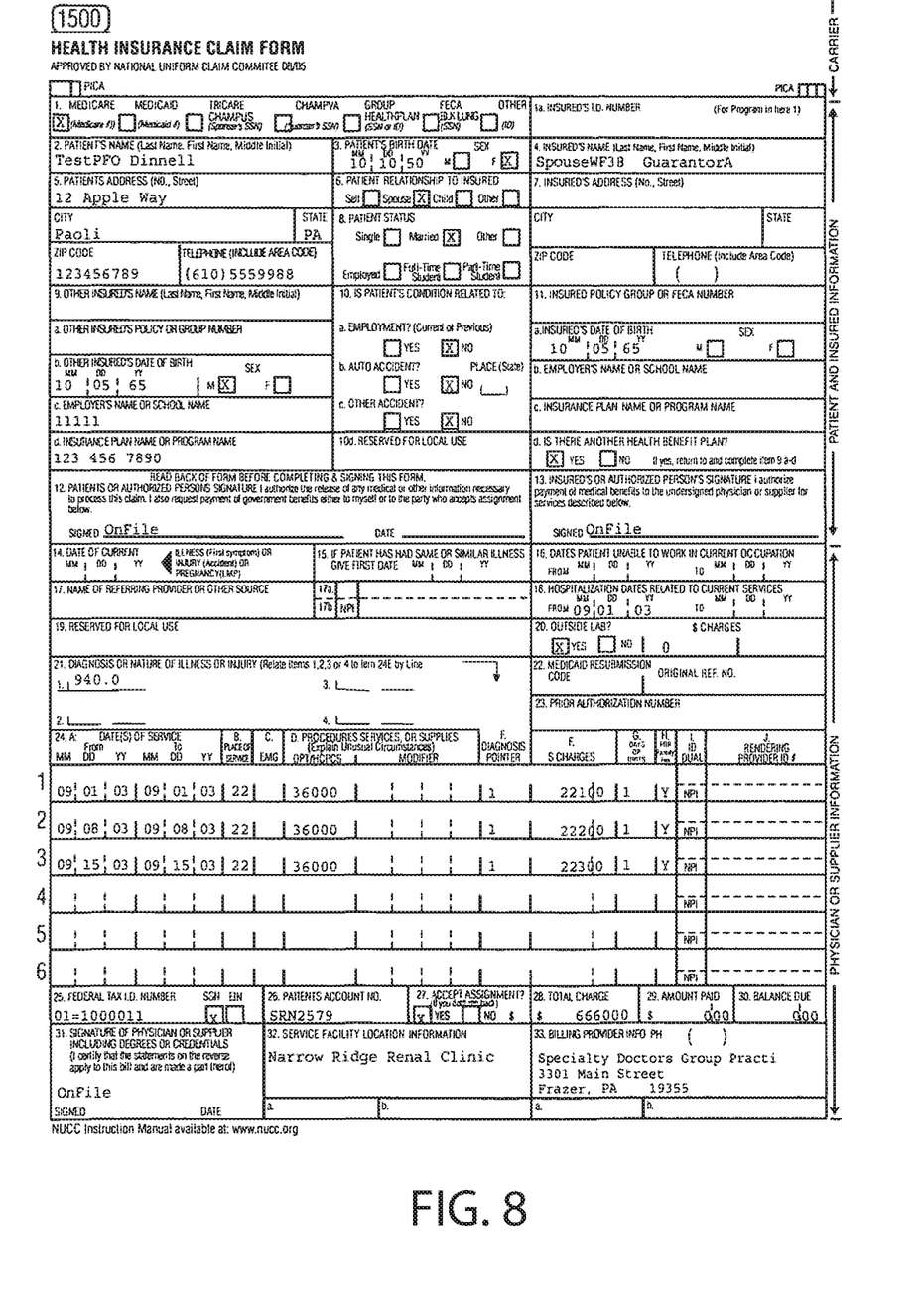

FIGS. 8 and 9 illustrate a particular claim reimbursement form (form 1500) prepared using system 10 employing first and second different sets of claim processing rules based on a common set of input claim data. In this illustration, an Application Service Provider (ASP) user implements use of a new claim form (a 1500 claim form) to support annual rule changes required by a regulatory authority. A healthcare provider organization desires to verify that a claim processing rule change works when applied to special rules for Payer2 organization claim forms for renal dialysis patients. A healthcare provider organization imports standard rule changes into system 10 and executes several iterations of claim form renal dialysis examples to verify that the special rules continue to work with annual rule changes required by the regulatory authority. In response to successful validation, the healthcare provider organization documents that the change did not adversely affect the category of patients concerned. Specifically, FIG. 9 highlights (e.g., in yellow or with any other visual attribute) that the only annual rule resultant change 807 to the 1500 form is to add a billing provider phone number in Box 33. This billing provider phone number is absent from corresponding 1500 form of FIG. 8 generated by the first set of claim processing rules. Comparator 35 enables a user to readily determine the change by automatically identifying and highlighting the change following processing of the common set of input claim data by rules processor 15.

Figure 10:
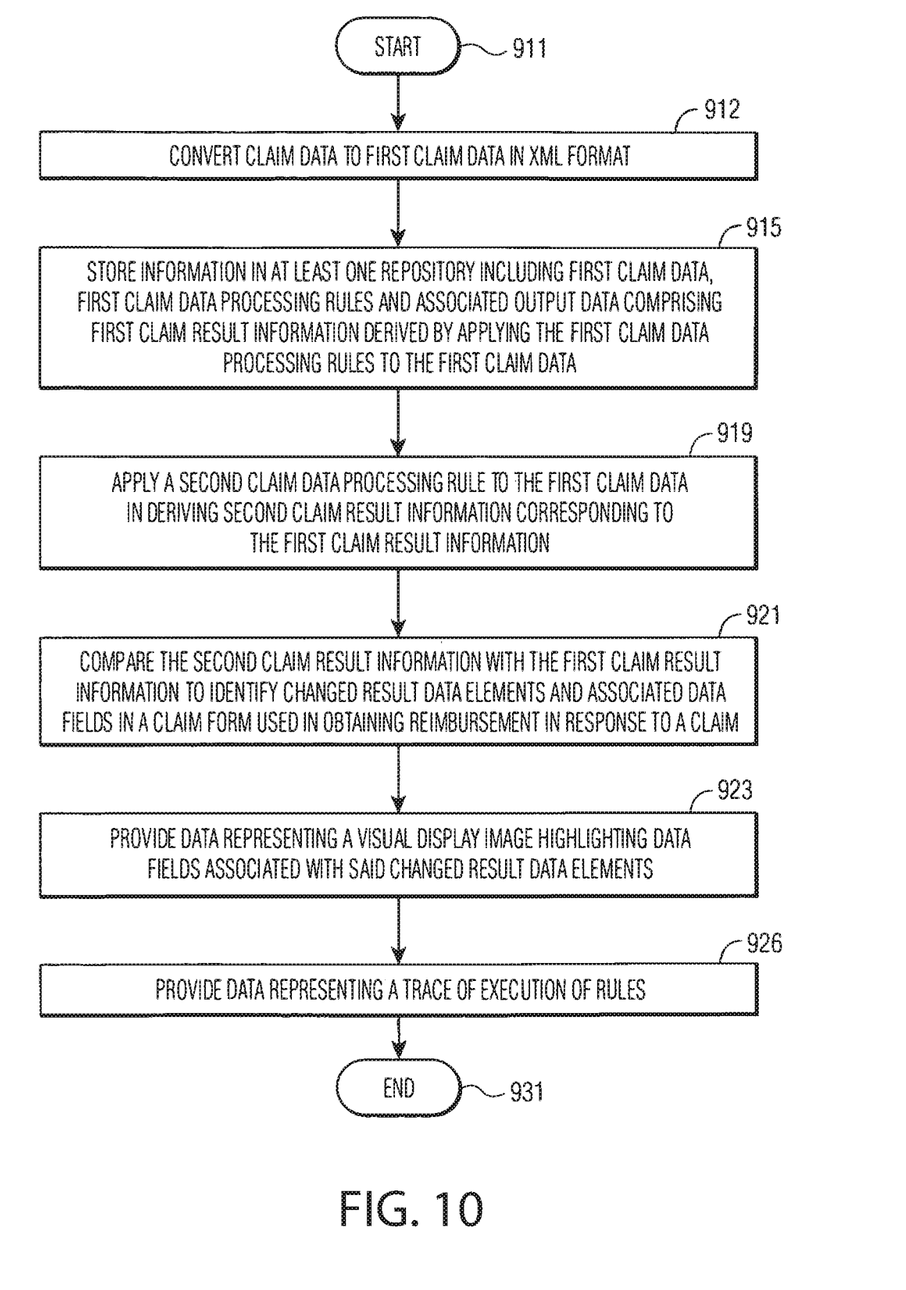
FIG. 10 shows a flowchart of a process performed by a system for evaluating processing rules, according to invention principles.

FIG. 10 shows a flowchart of a process performed by system 10 for evaluating processing rules. In step 912 following the start at step 911, a transformation processor in rules processor 15 (FIG. 1) converts claim data to first claim data in Extensible Markup Language (XML) compatible format. In step 915, system 10 stores information in at least one repository 17 including the first claim data, first claim data processing rules and associated output data comprising first claim result information derived by applying the first claim data processing rules to the first claim data. The information in at least one repository 17 includes multiple sets of first claim data. User interface 26, together with workstation 12, enables a user to select the first claim data from the multiple sets of first claim data. The first claim data processing rules comprise payer organization rules and the information in at least one repository 17 includes user organization rules including at least one of, (a) user organization specific rules and (b) user organization customized rules. The information in at least one repository 17 also includes multiple sets of sets of first claim data processing rules and associated output data comprising multiple sets of first claim result information. The result information is derived by applying corresponding sets of the multiple sets of first claim data processing rules to corresponding individual sets of the multiple sets of the first claim data.

Further, the first claim result information is derived by applying the payer organization rules and the user organization rules to the first claim data. The information in at least one repository 17 also includes changed rules derived from rule information provided by a regulatory authority associated with setting reimbursement rates for treatment services and includes data indicating a first processing time duration associated with applying the first claim data processing rules to the first claim data.

In step 919, rules processor 15 applies one or more second claim data processing rules, derived from a source, to the first claim data in deriving second claim result information corresponding to the first claim result information. Further, rules processor 15 applies one or more second claim data processing rules, together with rules of a set of the first claim data processing rules, to a selected set of the first claim data in deriving a set of second claim result information corresponding to a set of the first claim result information. Rules processor 15 automatically determines a second processing time duration associated with applying the one or more second claim data processing rules to the first claim data. Comparator 35, in step 921, compares the second claim result information with the first claim result information to identify changed result data elements and associated data fields in a claim form used in obtaining reimbursement in response to a claim. In step 923, output processor 34 provides data representing a visual display image highlighting data fields associated with the changed result data elements. Output processor 34 also provides data representing an electronic transaction message highlighting data fields associated with the changed result data elements. Output processor 34 further provides data indicating the first and second time durations. In step 926, trace processor 39 provides data representing a trace of execution of rules including the second claim data processing rule applied in processing the first claim data enabling a user to verify the second claim data processing rule had been executed. The process of FIG. 10 terminates at step 931.

The systems and processes of FIGS. 1-10 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The system automatically evaluates the effect of changing claim data processing and claim form completion and generation rules by identifying and highlighting changes in claim data and changes in data in a prepared form to facilitate user identification of the changes. The processes and applications may, in alternative embodiments, be located on one or more (e.g., distributed) processing devices accessing a network linking the elements of FIG. 1. Further, any of the functions and steps provided in FIGS. 1-10 may be implemented in hardware, software or a combination of both and may reside on one or more processing devices located at any location of a network linking the elements of FIG. 1 or another linked network, including the Internet.

The invention claimed is:

1. A system including at least one hardware processing device for simulating and validating integrated system performance for changes to processing rules used for processing a claim form and data related to reimbursement for provision of healthcare to a patient by specific payer organizations, comprising:
   at least one repository of information including:
      a validation output data set comprising validation claim result data derived from processing a plurality of validation claims according to a validation set of claim data processing rules, the validation output data set comprising a validation processing time duration corresponding to a processing time required to process the plurality of validation claims; and
      a set of modified claim data processing rules comprising at least one claim data processing rule that is different from at least one claim data processing rule of the validation set of claim data processing rules;
   a rules processor, in a simulated healthcare reimbursement system, for:
      processing the plurality of validation claims according to the set of modified claim data processing rules and generating modified claim result data;
      based on the modified claim result data, generating a modified output data set, the modified output data set comprising:
         a modified processing time duration corresponding to a processing time required to process the plurality of validation claims according to the set of modified claim data processing rules;
   a comparator for validating the set of modified claim data processing rules, the comparator being configured to:
      compare the modified output data set with the validation output data set; and
      determine a change in rules processing duration by comparing the modified processing time duration to the validation processing time duration; and
   an output processor for providing a validated output form that includes an indication of the change in rules processing duration, and storing the validated output form in a validated output form directory.

2. The system of claim 1, wherein the set of modified claim data processing rules comprises one or more changes to a code for processing the plurality of validation claims.

3. The system of claim 1, further comprising a trace processor for providing data representing a trace of execution of rules including the modified claim data processing rules applied in processing the plurality of validation claims and for verifying that the modified claim data processing rules have been executed.

4. The system of claim 1, wherein the output processor provides data representing an electronic transaction message highlighting data fields associated with one or more changed data elements.

5. The system of claim 1, wherein the at least one repository of information includes a plurality of sets of validation claim data processing rules and includes a user interface enabling a user to select the validation set of claim data processing rules from the plurality of sets of validation claim data processing rules.

6. The system of claim 1, further comprising a transformation processor for converting the validation set of claim data processing rules and the set of modified claim data processing rules to an Extensible Markup Language (XML) compatible format.

7. The system of claim 1, wherein the validation set of claim data processing rules comprises payer organization rules.

8. The system of claim 7, wherein the payer organization rules include at least one of payer organization specific rules and payer organization customized rules.

9. The system of claim 1, wherein the set of modified claim data processing rules comprises payer organization rules derived from rule information provided by a regulatory authority associated with setting reimbursement rates for treatment services.

10. One or more hardware processors storing nontransitory machine-readable instructions that, when used by one or more computing devices, cause the one or more computing devices to perform a method for simulating integrated system performance for changes to processing rules used for processing claim data related to reimbursement for provision of healthcare to a patient by specific payer organizations, comprising the activities of:
storing, in at least one repository, a plurality of validation claims, a validation set of claim data processing rules, and a validation output data set comprising validation claim result data derived from processing the plurality of validation claims according to the validation set of claim data processing rules, the validation output data set comprising a validation processing time duration corresponding to a processing time required to process the plurality of validation claims;
receiving a set of modified claim data processing rules, the set of modified claim data processing rules including at least one claim data processing rule that is different from at least one claim data processing rule of the validation set of claim data processing rules;
processing the plurality of validation claims according to the set of modified claim data processing rules and generating modified claim result data;
validating successful execution of the set of modified claim data processing rules;
generating a modified output data set, the modified output data set comprising a modified processing time duration corresponding to a processing time required to process the plurality of validation claims according to the set of modified claim data processing rules;
determining a change in rules processing duration by comparing the modified processing time duration to the validation processing time duration; and
communicating the set of modified claim data processing rules to a production claim processing system for processing a plurality of non-test claims.

11. The one or more hardware processors of claim 10, wherein the validation set of claim data processing rules represents a version of claim data processing rules used in a non-simulated healthcare reimbursement system for processing healthcare reimbursement claims.

12. The one or more hardware processors of claim 10, wherein the plurality of validation claims are processed according to the set of modified claim data processing rules in a simulated healthcare reimbursement system.

13. The one or more hardware processors of claim 10, further comprising producing a diagnostic trace log for tracing execution of the set of modified claim data processing rules.

14. The one or more hardware processors of claim 10, wherein processing the plurality of validation claims according to the set of modified claim data processing rules comprises processing a plurality of iterations of the plurality of validation claims according to the set of modified claim data processing rules.

15. A method for simulating integrated system performance for changes to processing rules used for processing claim data related to reimbursement for provision of healthcare to a patient by specific payer organizations, the method comprising:
storing, in at least one repository, a plurality of validation claims, a validation set of claim data processing rules, and a validation output data set comprising validation claim result data derived from processing the plurality of validation claims according to the validation set of claim data processing rules, the validation output data set comprising a validation processing time duration corresponding to a processing time required to process the plurality of validation claims;
receiving a set of modified claim data processing rules comprising at least one claim data processing rule that is different from at least one claim data processing rule of the validation set of claim data processing rules;
processing the plurality of validation claims according to the set of modified claim data processing rules and generating modified claim result data;
generating a modified output data set, the modified output data set comprising a modified processing time duration corresponding to a processing time required to process the plurality of validation claims according to the set of modified claim data processing rules;
determining a change in rules processing duration by comparing the modified processing time duration to the validation processing time duration; and
communicating the set of modified claim data processing rules to a production claim processing system.

16. The method of claim 15, wherein the validation set of claim data processing rules comprise payer organization rules.

17. The method of claim 15, wherein the set of modified claim data processing rules comprise payer organization rules derived from rule information provided by a regulatory authority associated with setting reimbursement rates for treatment services.

18. The method of claim 15, further comprising validating successful execution of the set of modified claim data processing rules.

19. The method of claim 15, further comprising associating the modified processing time duration with the set of modified claim data processing rules.

20. The method of claim 19, further comprising storing the modified processing time duration and the associated modified claim data processing rules in a repository.

* * * * *

UNITED STATES PATENT AND TRADEMARK OFFICE
CERTIFICATE OF CORRECTION

| | |
|---|---|
| PATENT NO. | : 10,657,612 B2 |
| APPLICATION NO. | : 15/630086 |
| DATED | : May 19, 2020 |
| INVENTOR(S) | : James D. Christen |

It is certified that error appears in the above-identified patent and that said Letters Patent is hereby corrected as shown below:

In the Specification

Column 05, Line 33: Please remove "UB04 BCBS.xml)," and replace with --UB04BCBS.xml),--.

Column 05, Line 34: Please remove "date timestamp" and replace with --date_timestamp--.

Column 05, Line 35: Please remove "UB04 BCBS" and replace with --UB04BCBS--.

Signed and Sealed this
Seventh Day of July, 2020

Andrei Iancu
*Director of the United States Patent and Trademark Office*